W. T. NICHOLLS.
APPARATUS FOR MANUFACTURING GLASS TILES.
APPLICATION FILED NOV. 20, 1907.

909,014. Patented Jan. 5, 1909.

WITNESSES
W. W. Swartz
R. A. Balderson

INVENTOR
Wm. T. Nicholls,
by Bakewell, Byrnes & Parmelee,
his Attys.

UNITED STATES PATENT OFFICE.

WILLIAM T. NICHOLLS, OF WELLSBURG, WEST VIRGINIA.

APPARATUS FOR MANUFACTURING GLASS TILES.

No. 909,014.  Specification of Letters Patent.  Patented Jan. 5, 1909.

Application filed November 20, 1907. Serial No. 402,995.

*To all whom it may concern:*

Be it known that I, WILLIAM T. NICHOLLS, of Wellsburg, Brooke county, West Virginia, have invented a new and useful Apparatus for Manufacturing Glass Tiles, of which the following is a full, clear, and exact description, reference being had to the accompanying drawings, forming part of this specification, in which—

Figure 1:
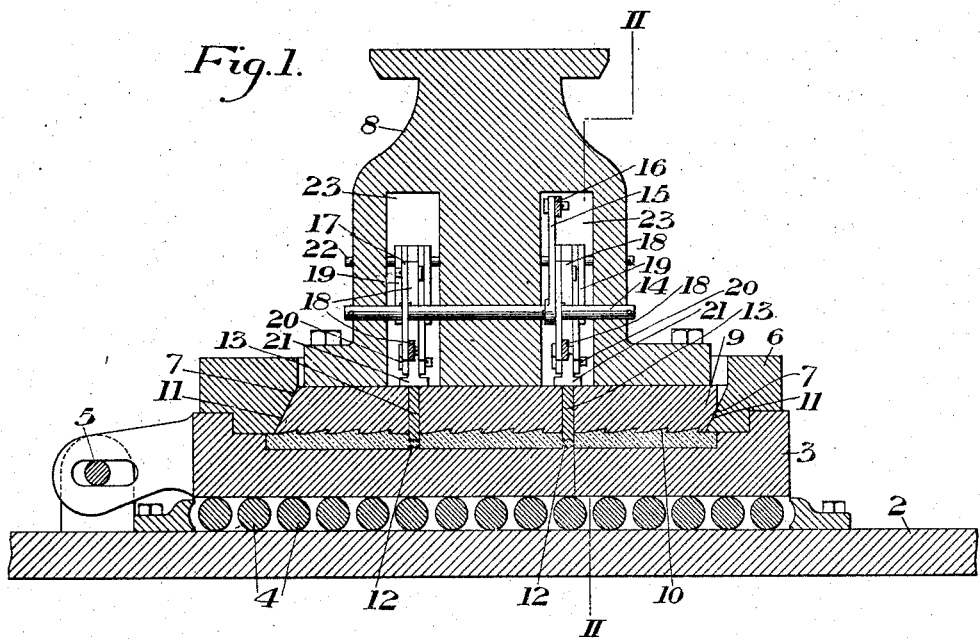
Figure 2:
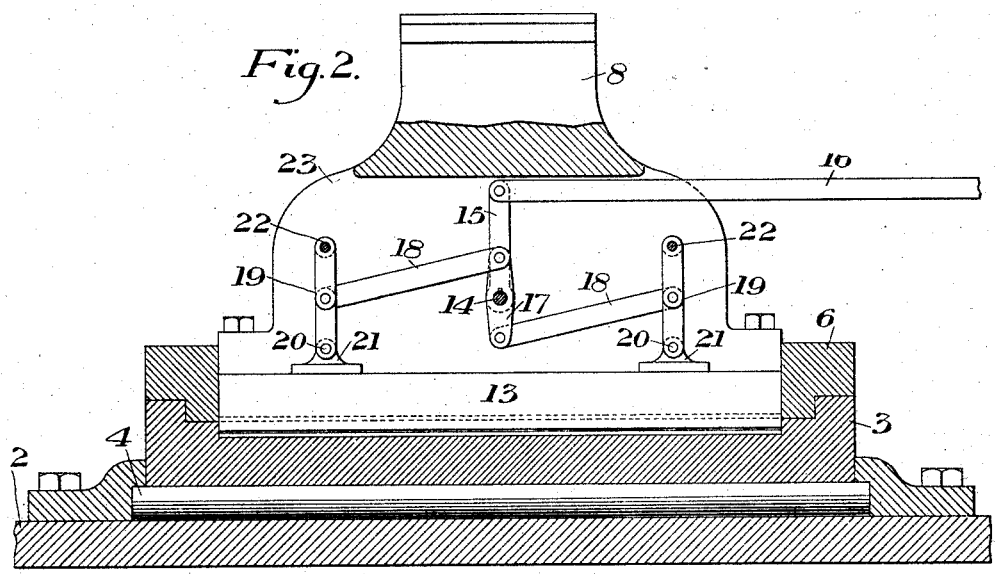

Figure 1 is a vertical section of tile-forming apparatus embodying my invention; and Fig. 2 is a section on the line II—II of Fig. 1.

My invention has relation to apparatus for the manufacture of glass tiles of the class which are provided with undercut ribs or projections on their inner or seating faces, and is designed to provide apparatus of this character by means of which a plurality of tiles can be pressed into shape by one and the same operation.

The precise nature of my invention will be best understood by reference to the accompanying drawings, in which I have shown one form of apparatus embodying my invention, and which will now be described, it being premised, however, that various changes may be made in the details of construction and arrangement, without departing from the spirit and scope of my invention as defined in the appended claims.

In the drawings, the numeral 2 designates a supporting surface or table, and 3 a mold box supported on said surface or table through the medium of the anti-friction rollers 4. The box is preferably hinged to the table at one side, as indicated at 5, the hinged connection being a slotted one to permit a reciprocating movement of the box upon the rollers 4.

6 is a top ring, which is removably seated upon the mold-box 3, and which is formed with the interior opposite parallel cam surfaces or inclines 7.

8 designates a plunger, which may be operated by any suitable means known in this art. Secured to the bottom face of this plunger is a presser plate 9, having in its under surface a plurality of undercut recesses 10 which are designed to form the undercut ribs or projections on one surface of the tile, as clearly shown Fig. 1. This pressure plate is formed at opposite edges with the cam surfaces or inclines 11 corresponding to the cam surfaces or inclines 7 of the top ring, so that when the presser plate is entered into the mold and withdrawn therefrom, the engagement of these cam surfaces or inclines will cause a movement of the mold box upon the anti-friction rollers 4 to form the undercut projections on the tile and to permit the presser plate to clear these projections as it is withdrawn.

The mold box is of sufficient size to form a plurality of tiles at the same operation, and its bottom wall has shallow ribs or projections 12 which partially divide the interior of the box into compartments, each of the proper dimensions for one tile. Coöperating with these ribs or projections 12, for the purpose of more completely severing the body of glass into the separate tile shapes, the presser plate is provided with the cutting-off plates or blades 12, which are seated to move in vertical slots in the presser plate. These cutting-off blades or knives may be actuated by any suitable means. In the apparatus shown in the drawings, a rocker shaft 14 is journaled in the plunger with a lever arm 15 secured thereto, and to which is connected an actuating lever 16. The shaft 14 also carries opposite arms 17, which are connected by links 18 with toggle links 19. These toggle links are arranged in pairs, one link of each pair being pivoted at 20 to a lug 21 secured to the plate or blade 13, and the other link being pivoted on a pin or shaft 22 extending through the plunger. The operating devices for the blades just described are placed within slots 23 in the plunger.

The operation is as follows:—A batch of glass is placed in the mold box and the plunger is operated to enter the presser plate or into the box and press the glass into form. The pressure on the plunger is then slightly relieved and the lever 16 is actuated to force the cutting-off blades 13 through the presser plate into the mold, as shown in the drawings, thereby partially severing the formed glass sheet into the desired number of tile shapes. The opposing faces of the cutting-off blades 13 and of the shallow ribs or projections 12 are preferably of V-shape so as to more nearly sever the glass at the edges of the individual tiles to thereby render the subsequent complete separation easier. The movement of the mold box upon the rollers 12 enables the presser plate to readily free itself from the undercut projections in the manner above described.

By the use of the movable cutting-off blades, the ribs or projections 12 on the bottom of the mold box may be made very short or shallow, so that the glass will readily flow over their upper edges from one tile-forming compartment of the box to another under the action of the plunger and presser plate, thus insuring the proper distribution of the glass in the several compartments.

Any desired number of compartments may be provided, with a corresponding number of the cutting-off blades. These compartments may be of various sizes and forms, according to the size and shape of tiles which it is desired to make. Any other means of well-known character may be employed to provide the necessary relative lateral motion of the plunger and mold box to enable the presser plate to readily withdraw or clear itself from the undercut projections. Various other means may be provided for operating the cutter blades, and numerous changes may be made in the details of construction and arrangement of the parts without departing from the spirit and scope of my invention.

I claim:—

1. In apparatus for forming glass tiles, a mold box having a shallow projection on its bottom wall, and partially separating the box into compartments, a pressing device arranged to enter the box and having undercut projections on its under surface, means for effecting a relative lateral movement of the box and pressing device, and a cutting-off member carried by the pressing device and movable through its forming surface in line with the shallow projection on the bottom of the mold box; substantially as described.

2. In apparatus for the manufacture of glass tiles having undercut projections, a mold box having undercut recesses in its working face, a pressing device arranged to enter the box, means for effecting a relative lateral movement of the box and pressing device, a movable cutting-off member carried by the pressing device, and means for actuating the cutting-off member; substantially as described.

3. In apparatus for manufacturing glass tiles, a mold box having a plurality of shallow ribs or projections on its bottom wall, a plunger adapted to enter the top of the box and having a forming surface on its under side, a series of movable cutting-off members or blades carried by the plunger and arranged to be projected through the forming surface in line with the ribs or projections of the box, and means for actuating said members or blades; substantially as described.

4. In apparatus for the manufacture of glass tiles having undercut projections, a movably supported mold box, a plunger arranged to enter said box and having undercut recesses in its lower face, said plunger and box having coöperating cam surfaces, and the box having shallow ribs or projections on its bottom, and movable cutting-off members or blades carried by the plunger in line with the ribs or projections of the box; substantially as described.

In testimony whereof, I have hereunto set my hand.

WILLIAM T. NICHOLLS.

Witnesses:
H. M. CORWIN,
GEO. H. PARMELEE.